US012241374B2

(12) United States Patent
Thomas et al.

(10) Patent No.: US 12,241,374 B2
(45) Date of Patent: Mar. 4, 2025

(54) CERAMIC MATRIX COMPOSITE ENDWALL SEALING AROUND VANE AIRFOIL OF GAS TURBINE ENGINE

(71) Applicant: Rolls-Royce Corporation, Indianapolis, IN (US)

(72) Inventors: David J. Thomas, Indianapolis, IN (US); Thomas Nixon, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/195,700

(22) Filed: May 10, 2023

(65) Prior Publication Data

US 2024/0376831 A1 Nov. 14, 2024

(51) Int. Cl.

| | |
|---|---|
| ***F01D 11/00*** | (2006.01) |
| ***F01D 9/04*** | (2006.01) |
| ***F01D 25/14*** | (2006.01) |

(52) U.S. Cl.

CPC ............ *F01D 11/003* (2013.01); *F01D 9/041* (2013.01); *F01D 25/145* (2013.01); *F05D 2240/15* (2013.01); *F05D 2240/56* (2013.01); *F05D 2300/6033* (2013.01)

(58) Field of Classification Search

CPC ...... F01D 11/00; F01D 11/003; F01D 11/005; F01D 9/00; F01D 9/02; F01D 9/04; F01D 9/041; F01D 9/042; F01D 5/145; F01D 5/28; F01D 5/284; F05D 2240/15; F05D 2240/56; F05D 2260/941; F16J 15/3288; F16J 15/3292

See application file for complete search history.

(56) References Cited

U.S. PATENT DOCUMENTS

| | | | | |
|---|---|---|---|---|
| 5,029,875 | A * | 7/1991 | Spain ...................... | F01D 11/00 415/173.5 |
| 5,630,700 | A | 5/1997 | Olsen et al. | |
| 6,648,597 | B1 | 11/2003 | Widrig et al. | |
| 8,206,100 | B2 | 6/2012 | Schuler et al. | |
| 8,926,262 | B2 | 1/2015 | Tanahashi et al. | |
| 9,169,736 | B2 | 10/2015 | Hayford et al. | |
| 9,726,028 | B2 | 8/2017 | Marra et al. | |
| 10,174,619 | B2 | 1/2019 | Uskert et al. | |
| 10,233,764 | B2 | 3/2019 | Thomas et al. | |
| 10,450,897 | B2 | 10/2019 | Gallier et al. | |
| 11,242,762 | B2 | 2/2022 | Burdette et al. | |
| 11,268,394 | B2 | 3/2022 | Frey et al. | |
| 11,306,617 | B2 | 4/2022 | Gallier et al. | |
| 11,319,822 | B2 | 5/2022 | Freeman et al. | |
| 11,441,436 | B2 | 9/2022 | Frey et al. | |
| 11,486,497 | B2 | 11/2022 | Davis et al. | |
| 11,536,148 | B2 | 12/2022 | Surace et al. | |
| 2002/0127097 | A1 * | 9/2002 | Darolia .................. | F01D 9/042 415/137 |

(Continued)

*Primary Examiner* — Elton K Wong

(74) *Attorney, Agent, or Firm* — Barnes & Thornburg LLP

(57) ABSTRACT

A turbine vane assembly includes a flow path ring, an airfoil heat shield, and a seal. The flow path ring is made of ceramic matrix composite materials. The airfoil heat shield is made of ceramic matrix composite materials. The seal resists passage of gases through a gap formed between the flow path ring and the airfoil heat shield along an interface at the airfoil aperture.

16 Claims, 6 Drawing Sheets

(56) References Cited

U.S. PATENT DOCUMENTS

| | | | | |
|---|---|---|---|---|
| 2008/0199307 | A1* | 8/2008 | Keller | F01D 5/22<br>277/355 |
| 2012/0009071 | A1* | 1/2012 | Tanahashi | F01D 5/282<br>416/241 B |
| 2014/0144158 | A1* | 5/2014 | Sha | F16J 15/3288<br>415/170.1 |
| 2014/0255170 | A1* | 9/2014 | Hillier | F01D 11/08<br>415/174.2 |
| 2015/0068211 | A1* | 3/2015 | Rodriguez | F23R 3/46<br>60/722 |
| 2017/0101880 | A1* | 4/2017 | Thomas | F01D 9/042 |
| 2018/0135442 | A1* | 5/2018 | Propheter-Hinckley | F01D 11/003 |
| 2020/0165977 | A1* | 5/2020 | Nicolas | F04D 29/10 |
| 2020/0347738 | A1* | 11/2020 | Propheter-Hinckley | F01D 11/005 |
| 2023/0399982 | A1* | 12/2023 | Urac | F01D 11/005 |

* cited by examiner

CERAMIC MATRIX COMPOSITE ENDWALL SEALING AROUND VANE AIRFOIL OF GAS TURBINE ENGINE

FIELD OF THE DISCLOSURE

The present disclosure relates generally to gas turbine engines, and more specifically to turbine vanes for use in gas turbine engines

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over flow path components of the turbine, such as airfoils included in stationary vanes, rotating blades, and static shrouds arranged around the rotating blades. The interaction of combustion products with these components in the turbine heats the components to temperatures that require the components to be made from high-temperature resistant materials and/or to be actively cooled by supplying relatively cool air to the vanes and blades. To this end, incorporating composite materials adapted to withstand very high temperatures in the turbine may be desired. Design and manufacture of the flow path components of the turbine from composite materials presents challenges due to the geometry and strength limitations of composite materials.

SUMMARY

The present disclosure may comprise one or more of the following features and combinations thereof.

A turbine vane assembly adapted for use in a gas turbine engine may include a flow path ring, an airfoil heat shield, and a seal. The flow path ring may be made of ceramic matrix composite materials. The flow path ring may extend at least part way around a central axis. The flow path ring may be formed to include an airfoil aperture extending radially through the flow path ring.

In some embodiments, the airfoil heat shield may be made of ceramic matrix composite materials. The airfoil heat shield may extend through the airfoil aperture of the flow path ring. The airfoil heat shield may be mounted to allow for movement through the airfoil aperture to accommodate thermal growth of components associated with the turbine vane assembly during use of the turbine vane assembly in the gas turbine engine.

In some embodiments, the seal may be configured to resist passage of gases through a gap formed between the flow path ring and the airfoil heat shield along an interface at the airfoil aperture.

In some embodiments, the seal may include a plurality of ceramic bristles. The plurality of ceramic bristles may extend from the flow path ring toward the airfoil heat shield to engage an outer surface of the airfoil heat shield thereby establishing a brush seal element.

In some embodiments, the flow path ring may be shaped to include a radially-outwardly facing surface, a radially-inwardly facing surface, an aperture surface, and a chamfer surface. The radially-inwardly facing surface may be opposite the radially-outwardly facing surface that defines an outer boundary of a primary gas path. The aperture surface may extend from the radially-inwardly facing surface to define the airfoil aperture. The chamfer surface may extend between the radially-outwardly facing surface and the aperture surface and cooperate with the outer surface of the airfoil heat shield to define a groove.

In some embodiments, the seal may further include a compressible rope. The compressible rope may be located in the groove between the flow path ring and the airfoil heat shield.

In some embodiments, the aperture surface may be formed to include a slot. The slot may extend axially into the aperture surface.

In some embodiments, the seal may further include a seal plug. The seal plug may be made of monolithic ceramic material. The seal plug may be located in the slot.

In some embodiments, the plurality of ceramic bristles may be embedded in the seal plug. The plurality of ceramic bristles may be embedded in the seal plug so that the plurality of ceramic bristles extend from the seal plug located in the slot of the flow path ring toward the airfoil heat shield to engage the outer surface of the airfoil heat shield.

In some embodiments, the turbine vane assembly may further include a vane support structure. The vane support structure may be configured to support the airfoil heat shield relative to a turbine case included in the gas turbine engine.

In some embodiments, the vane support structure may include an outer support wall, a support spar, and a ridge. The outer support wall may be coupled to the turbine case that extends circumferentially at least partway about the central axis. The support spar may extend radially inward from the outer support wall through the flow path ring and into the airfoil heat shield. The ridge may extend radially inward from the outer support wall toward the flow path ring to retain the compressible rope in the groove.

In some embodiments, a portion of the outer surface of the airfoil heat shield that is engaged by the plurality of ceramic bristles of the seal may be provided by a coating different from any coating applied to other portions of the airfoil heat shield. The ceramic matrix composite materials of the airfoil heat shield may comprise reinforcing fibers. The airfoil heat shield may have a reduced amount of reinforcing fibers at a location where the seal engages the outer surface of the airfoil heat shield compared to the rest of the airfoil heat shield.

In some embodiments, the airfoil heat shield may have no reinforcing fibers at the location where the seal engages the outer surface of the airfoil heat shield. The outer surface of the airfoil heat shield may have a different surface finish at a location where the seal engages the outer surface of the airfoil heat shield compared to the rest of the outer surface of the airfoil heat shield.

In some embodiments, the outer surface of the airfoil heat shield may be a machined surface to provide the different surface finish at the location where the seal engages the outer surface of the airfoil heat shield compared to the rest of the outer surface of the airfoil heat shield. The outer surface of the airfoil heat shield may be an unmachined surface to provide the different surface finish at the location where the seal engages the outer surface of the airfoil heat shield compared to the rest of the outer surface of the airfoil heat shield.

In some embodiments, the outer surface of the airfoil heat shield may be a coating that is engaged by the plurality of ceramic bristles of the seal. The coating may be thicker at the location where the seal engages the outer surface of the airfoil heat shield compared to the rest of the outer surface of the airfoil heat shield.

In some embodiments, the outer surface of the airfoil heat shield may be a coating that is engaged by the plurality of ceramic bristles of the seal. The coating may be different at the location where the seal engages the outer surface of the airfoil heat shield compared to the rest of the outer surface of the airfoil heat shield.

In some embodiments, the plurality of ceramic bristles of the seal may be substantially perpendicular to the outer surface of the airfoil heat shield. The plurality of ceramic bristles of the seal may be at an angle relative to the outer surface of the airfoil heat shield.

In some embodiments, the airfoil heat shield may define a leading edge, a trailing edge, a pressure side, and a suction side. The trailing edge may be spaced apart axially from the leading edge. The pressure and suction sides may extend between and interconnect the leading edge and the trailing edge. An orientation of the plurality of ceramic bristles of the seal may be different based on a location around the leading edge, the trailing edge, the pressure side, and the suction side of the airfoil heat shield.

In some embodiments, the airfoil heat shield may define a leading edge, a trailing edge, a pressure side, and a suction side. The trailing edge may be spaced apart axially from the leading edge. The pressure and suction sides may extend between and interconnect the leading edge and the trailing edge. A density of the plurality of ceramic bristles of the seal may be varied based on a location around the leading edge, the trailing edge, the pressure side, and the suction side of the airfoil heat shield.

According to another aspect of the present disclosure, an assembly may include a first component, a second component, and a seal. The first component may be made of ceramic matrix composite materials. The first component may be formed to include an aperture extending therethrough.

In some embodiments, the second component may be made of ceramic matrix composite materials. The second component may extend through the aperture of the first component. The second component may be mounted to allow for movement through the aperture to accommodate thermal growth of components associated with the assembly during use of the assembly in a gas turbine engine.

In some embodiments, the seal may be configured to resist passage of gases through a gap formed between the first component and the second component along an interface at the aperture.

In some embodiments, the seal may include a plurality of ceramic bristles. The plurality of ceramic bristles may extend between the first component and an outer surface of the second component.

In some embodiments, the seal may further include a compressible rope. The compressible rope may be located in a groove formed between the first component and the second component.

In some embodiments, the ceramic matrix composite materials of the second component may comprise reinforcing fibers. The second component may have a reduced amount of reinforcing fibers at a location where the seal engages the outer surface of the second component compared to the rest of the second component. The second component may have no reinforcing fibers at the location where the seal engages the outer surface of the second component.

These and other features of the present disclosure will become more apparent from the following description of the illustrative embodiments.

DETAILED DESCRIPTION OF THE DRAWINGS

Figure 1:
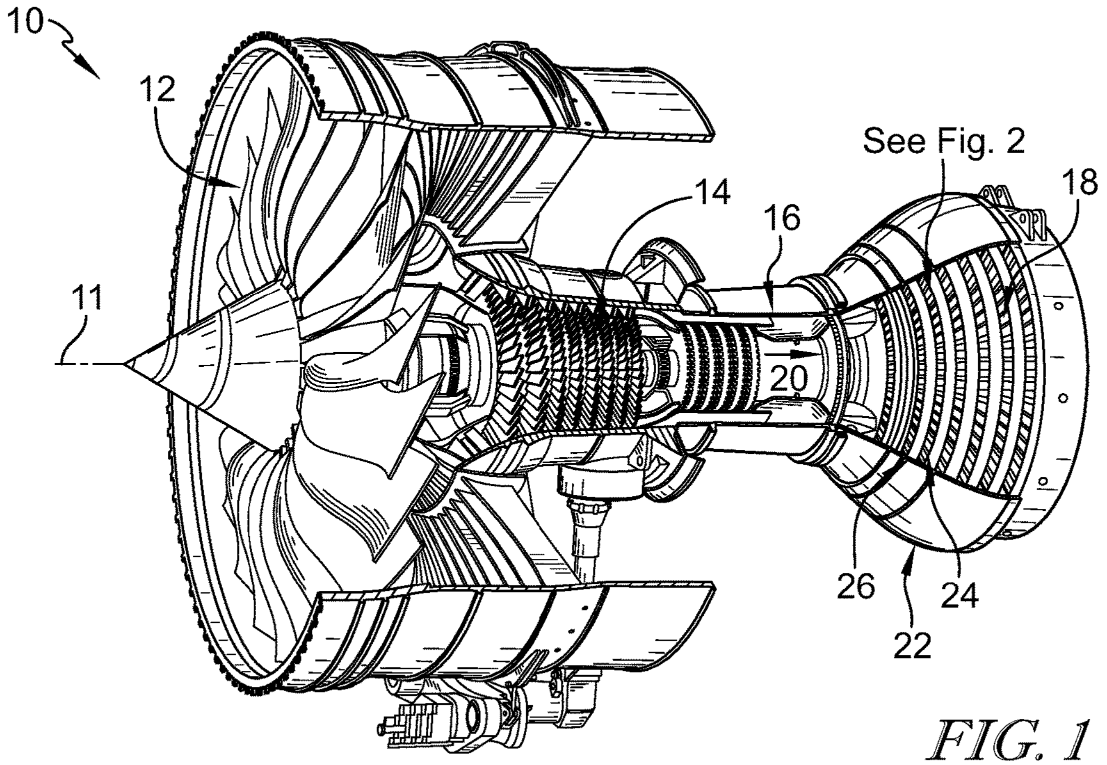
FIG. 1 is a cutaway perspective view of a gas turbine engine that includes a fan, a compressor, a combustor, and a turbine, the turbine including a turbine section comprising a case that extends circumferentially around a central axis of the gas turbine engine, rotating wheel assemblies configured to rotate about the axis of the gas turbine engine, and static turbine vane ring assemblies configured to direct air into downstream rotating wheel assemblies.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan 12 may be replaced with a propeller, drive shaft, or other suitable configuration.

Figure 2:
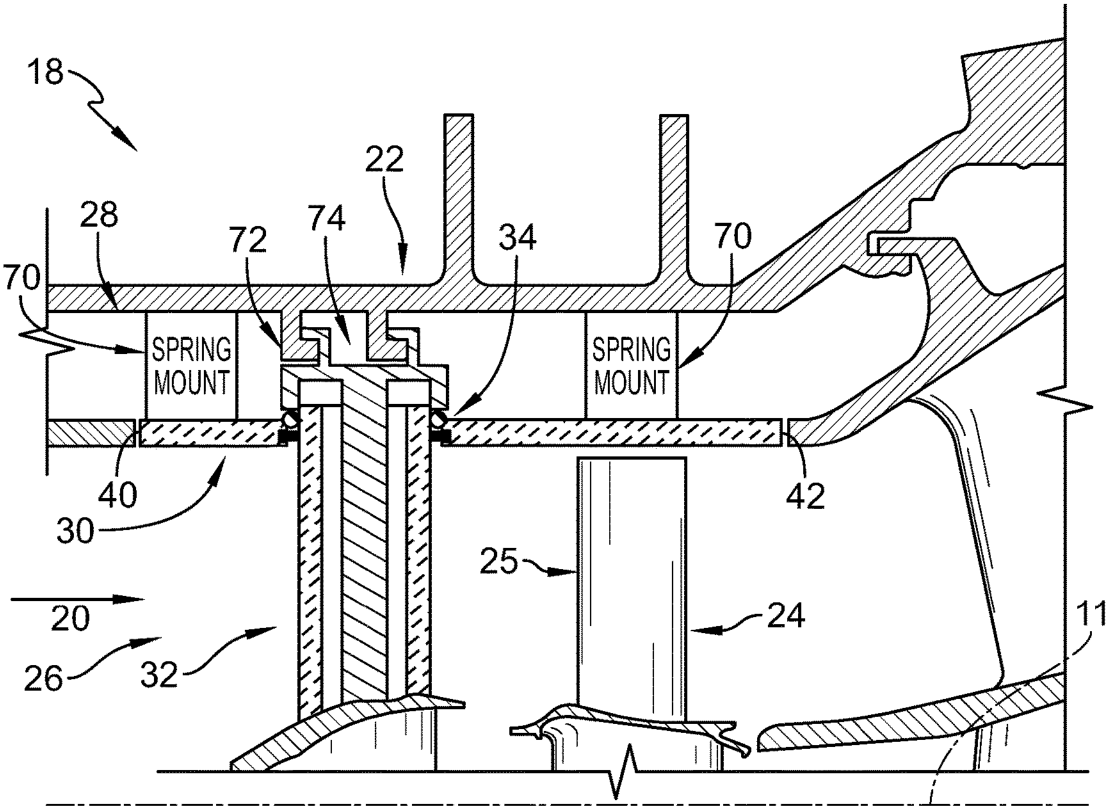
FIG. 2 is a cross-sectional view of a portion of the turbine section included in the gas turbine engine of FIG. 1 showing each turbine vane ring assembly includes a flow path ring made of ceramic matrix composite materials that extends at least part way around a central axis, an airfoil heat shield made of ceramic matrix composite materials that extends through an airfoil aperture formed in the flow path ring and is mounted to allow for movement through the airfoil aperture to accommodate thermal growth of components associated with the turbine vane assembly during use of the turbine vane assembly in the gas turbine engine, and a seal configured to resist passage of gases through a gap formed between the flow path ring and the airfoil heat shield along an interface near the airfoil aperture.

The turbine 18 includes a case 22, rotating wheel assemblies 24, turbine vane ring assemblies 26, and a mounting system 28 as shown in FIG. 2. The case 22 is made of metallic materials and extends circumferentially around the central axis 11 of the gas turbine engine 10. Each turbine wheel assembly 24 is configured to rotate about the axis 11 of the gas turbine engine 10. Each of the static turbine vane ring assembly 26 is configured to direct air into downstream rotating wheel assemblies 24. The mounting system 28 is configured to couple components of the turbine 18 to the case 22.

Each turbine vane ring assembly 26 includes a flow path ring 30 made of ceramic matrix composite materials, an airfoil heat shield 32 made of ceramic matrix composite materials, and a seal 34 as shown in FIGS. 2-5. The flow path ring 30 extends at least part way around the axis 11. The flow path ring 30 is formed to include an airfoil aperture 36 extending radially through the flow path ring 30. The airfoil heat shield 32 extends through the airfoil aperture 36 of the flow path ring 30.

The airfoil heat shield 32 is mounted to allow for movement through the airfoil aperture 36 to accommodate thermal growth of components associated with the turbine vane assembly 26 during use of the turbine vane assembly 26 in the gas turbine engine 10. The seal 34 is configured to resist passage of gases through a gap formed between the flow path ring 30 and the airfoil heat shield 32 along an interface at the airfoil aperture 36. The seal 34 includes a plurality of ceramic bristles 44 that extend from the flow path ring 30 toward the airfoil heat shield 32 to engage an outer surface 32S of the airfoil heat shield 32 thereby establishing a brush seal element.

In the illustrative embodiment, the flow path ring 30 and the airfoil heat shield 32 comprise ceramic matrix composite materials, while the case 22 and components of the mounting system 28 comprise metallic materials. Ceramic matrix composite materials can generally withstand higher temperatures than metallic materials. Therefore, incorporating ceramic matrix composite materials into the flow path ring 30 and the airfoil heat shield 32 may allow for increased temperatures within the turbine 18 as well as decreased cooling air usage such that the overall efficiency of the gas turbine engine 10 can be improved.

However, the ceramic matrix composite materials of the flow path ring 30 and the metallic materials of the case 22 grow and shrink at different rates when exposed to high and low temperatures due to the differing coefficients of thermal expansion of the materials. Therefore, coupling the flow path ring 30 to the case 22 and sealing between the flow path ring 30 and the airfoil heat shield 32 may be challenging.

Therefore, the seal 34 is located at the interface between the airfoil heat shield 32 and the flow path ring 30 to seal therebetween while the airfoil heat shield 32 is mounted to allow for movement through the airfoil aperture 36 to accommodate thermal growth of the components during use of the turbine vane assembly 26 in the gas turbine engine 10. In this way, the interface between the flow path ring 30 and the airfoil heat shield 32 is sealed while still accommodating for different rates of thermal expansion experienced by the ceramic matrix composite materials of the flow path ring 30 and the metallic materials of the case 22.

Figure 3:
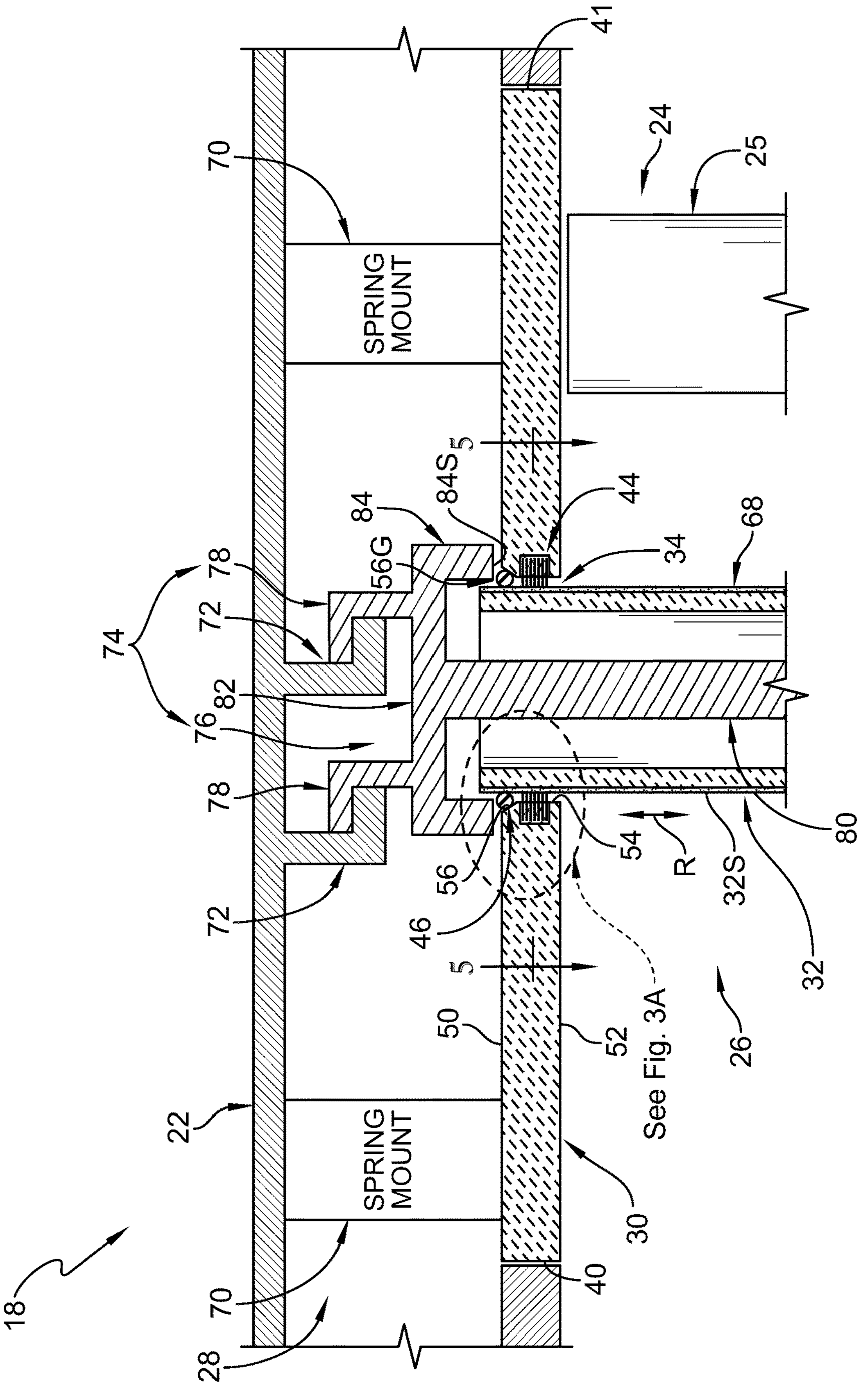
FIG. 3 is a detail view of the turbine section of FIG. 2 showing the seal includes a plurality of ceramic bristles or fibers that extend from the flow path ring toward the airfoil heat shield to engage an outer surface of the airfoil heat shield thereby establishing a brush seal element and a compressible rope located in a groove formed between the flow path ring and the airfoil heat shield.
Figure 4:
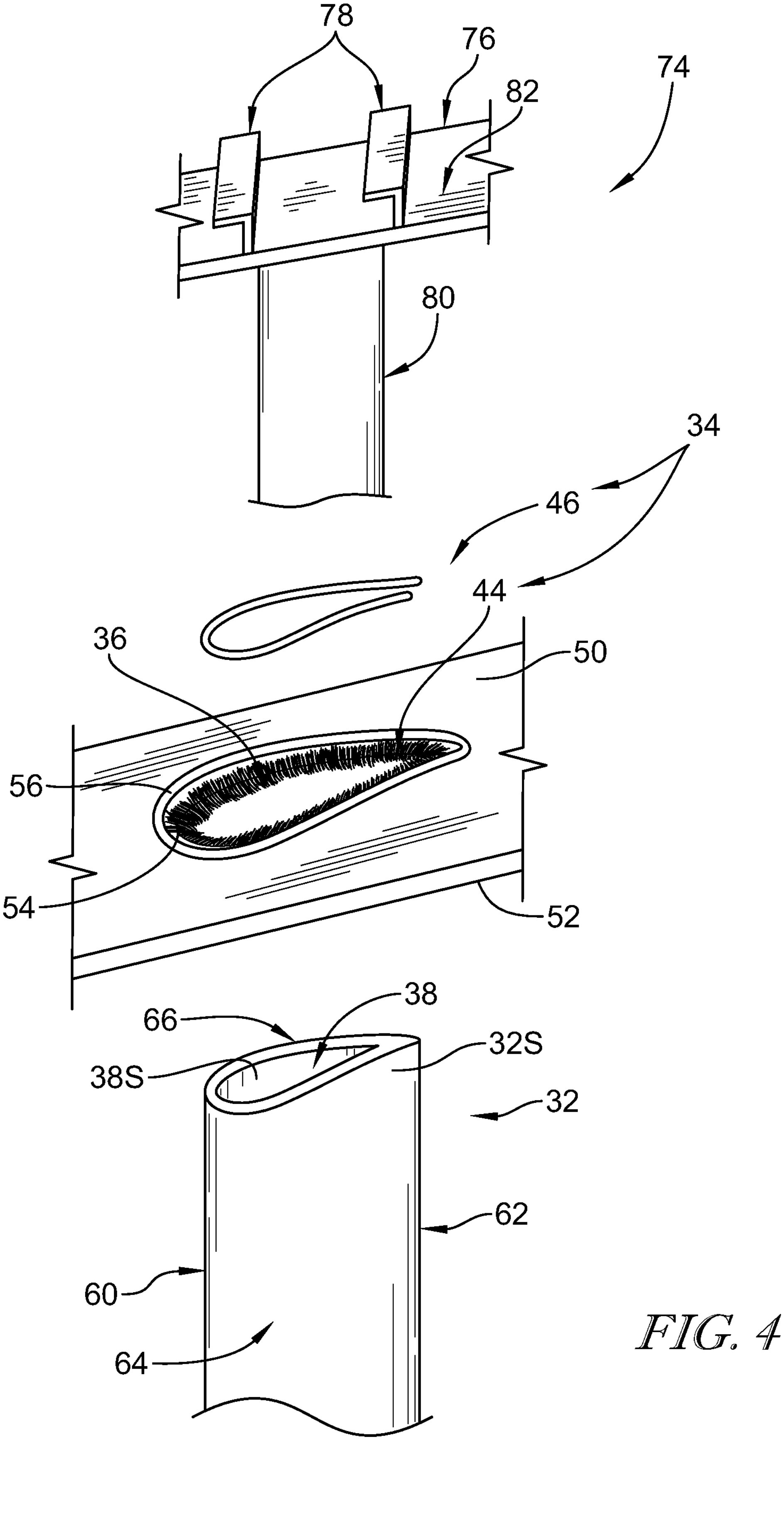
FIG. 4 is an exploded view of the turbine section of FIG. 3 showing the plurality of ceramic bristles of the seal are located in the airfoil aperture of the flow path ring and the compressible rope is configured to rest on a chamfer surface formed in the flow path ring around the airfoil aperture.

In the illustrative embodiment, the seal 34 includes a seal plug 42, the plurality of bristles 44, a compressible rope 46 as shown in FIGS. 2-4. The seal plug 42 is made of a monolithic ceramic material and is located in the airfoil aperture 36. The plurality of bristles 44 are embedded in the seal plug 42 so that the bristles 44 extend from the flow path ring 30 to engage the outer surface 32S of the airfoil heat shield 32. The bristles 44 are relatively brittle and fixed relative to the flow path ring 30. The compressible rope 46 is located in a groove 56G formed between the flow path ring 30 and the airfoil heat shield 32.

In the illustrative embodiments, the seal 34 includes both the seal plug 42, the bristles 44, and the compressible rope 46. In another embodiment, the seal 34 only includes the seal plug 42 and the plurality of ceramic bristles 44.

The plurality of ceramic bristles 44 may be single fibers in some embodiments. In some embodiments, the plurality of ceramic bristles 44' may be woven ceramic braids or yarns.

The orientation of the plurality of ceramic bristles 44 relative to the airfoil heat shield 32 may vary based on a location around the outer surface 32S of the airfoil heat shield 32 in the illustrative embodiment. The plurality of ceramic bristles 44 may extend from the flow path ring 30 either substantially perpendicular to the outer surface 32S of the airfoil heat shield 32 and/or at an angle relative to the outer surface 32S of the airfoil heat shield 32. Additionally, a density of the plurality of ceramic bristles 44 of the seal 34 may vary based on a location around the outer surface 32S of the airfoil heat shield 32.

Turning again to the turbine section 18, the flow path ring 30 defines an outer boundary of a primary gas path 20 of the gas turbine engine as shown in FIGS. 2 and 3. The flow path ring 30 forms an outer end wall of the airfoil heat shield 32.

In the illustrative embodiment, the flow path ring 30 extends between the airfoil heat shield 32 and a turbine blade 25 included in the turbine wheel assembly 24 to define the outer end wall of the airfoil heat shield 32 and the turbine shroud for the turbine wheel assembly 24. The flow path ring 30 extends axially between a forward end 40 located axially forward of the airfoil heat shield 32 and an aft end 41 located axially aft of the turbine blade 25. In other embodiments, the turbine 18 may include a separate turbine shroud assembly positioned to surround the turbine wheel assembly 24 to block combustion products from passing over the blades 25 without pushing the blades 25 to rotate.

The flow path ring 30 includes a radially-outwardly facing surface 50, the radially-inwardly facing surface 52 opposite the radially-outwardly facing surface, an aperture surface 54, and a chamfer surface 56 as shown in FIGS. 3 and 4. The radially-inwardly facing surface 52 defines the outer boundary of the primary gas path 20. The aperture surface 54 extends from the radially-inwardly facing surface 52 to define the airfoil aperture 36. The chamfer surface 56 extends between the radially-outwardly facing surface 50 and the aperture surface 54.

Figure 3A:
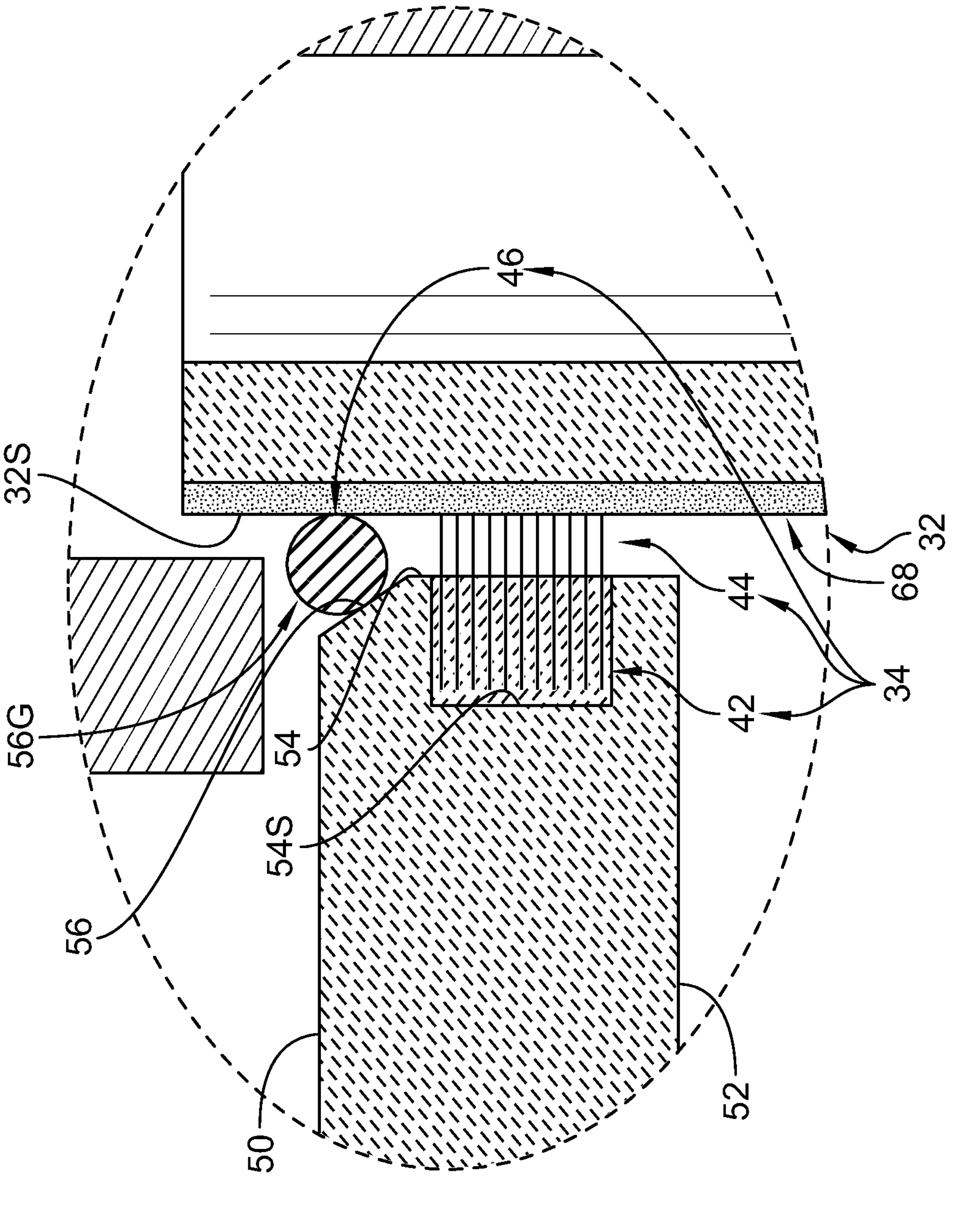
FIG. 3A is a detail view of the FIG. 3 showing the airfoil aperture of the flow path ring is machined to define a slot that extends axially into a surface of the airfoil aperture and the seal incudes a seal plug made of a monolithic ceramic material that is received in the slot and the plurality of ceramic bristles embedded in the seal plug.
Figure 3B:
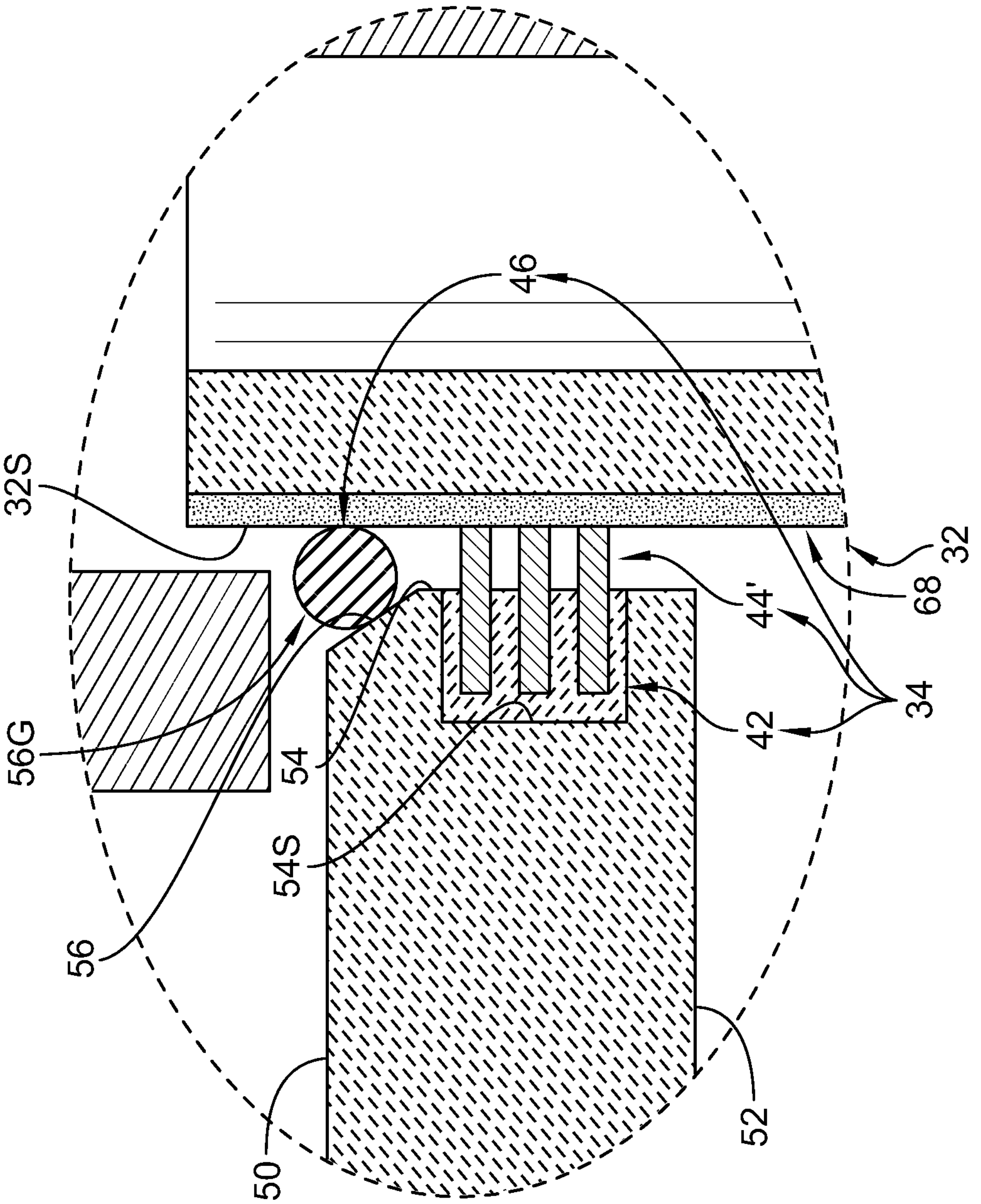
FIG. 3B is a detail view of another embodiment of the seal included in the turbine vane ring assembly of FIG. 3 showing the seal incudes a seal plug made of a monolithic ceramic material and a plurality of ceramic bristles embedded in the seal plug, and further showing the plurality of ceramic bristles comprise a plurality of woven ceramic braids or yarns.

The aperture surface 54 is shaped to include a slot 54S that extends axially into the aperture surface 54 as shown in FIGS. 3A and 3B. The slot 54S receives the seal plug 42 so that the seal plug 42 and embedded bristles 44 are coupled with the flow path ring 30. The bristles 44 extends from the seal plug 42 located in the slot 54S to extend from the flow path ring 30 to engage the outer surface 32S of the airfoil heat shield 32.

The chamfer surface 56 cooperates with the outer surface 32S of the airfoil heat shield 32 to define the groove 56G as shown in FIGS. 3 and 4. The compressible rope 46 is located in the groove 56G between the flow path ring 30 and the airfoil heat shield 32 to seal therebetween. The plurality of ceramic bristles 44 extend from the aperture surface 54 and engage the outer surface 32S of the airfoil heat shield 32.

Figure 5:
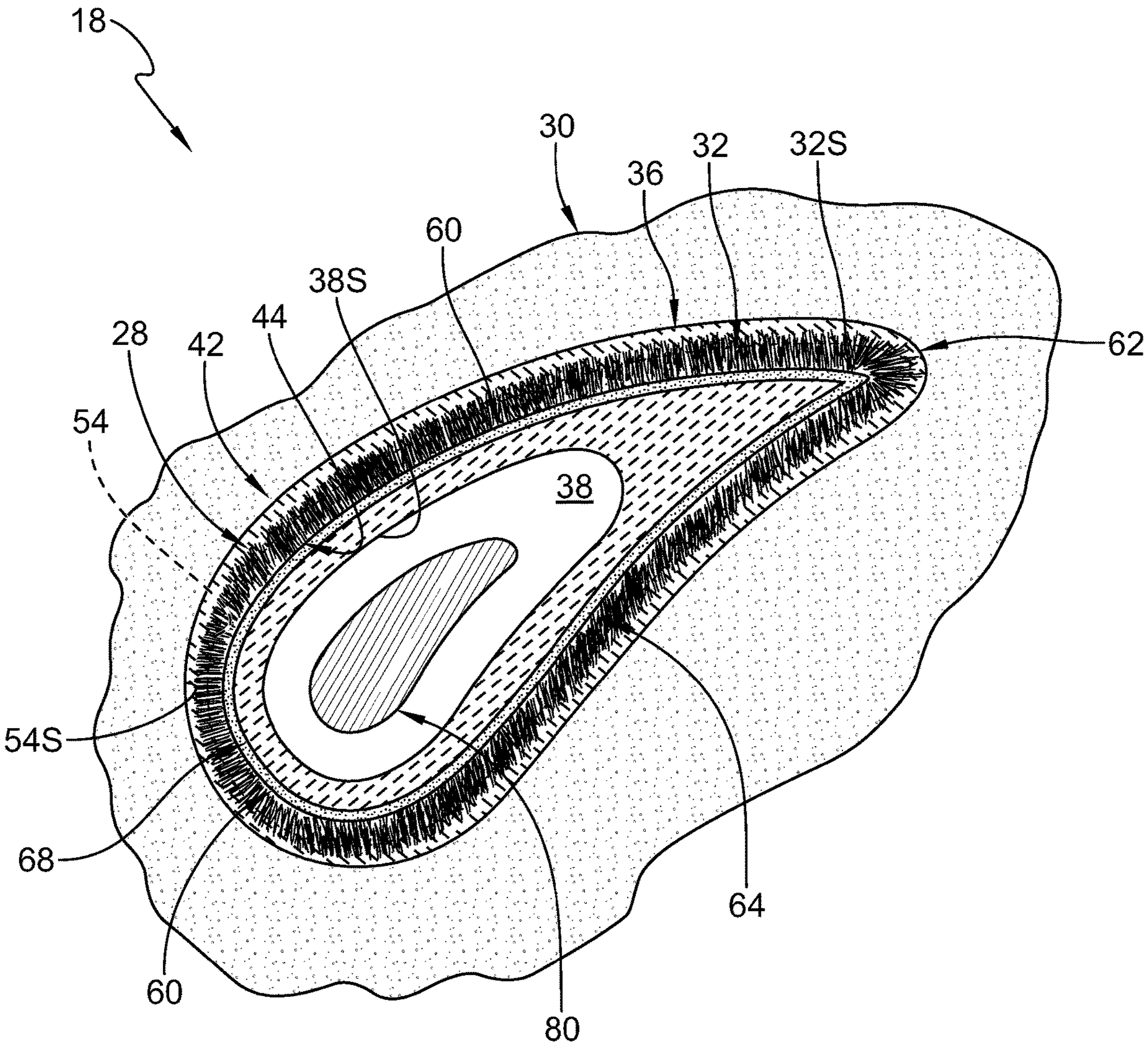
FIG. 5 is a cross-section view of the turbine section of FIG. 3 taken along 5-5 showing the ceramic bristles of the seal extend around and engage a leading edge, a trailing edge, a pressure side, and a suction side of the turbine vane.

The airfoil heat shield 32 defines a leading edge 60, a trailing edge 62 spaced apart axially from the leading edge 60 a pressure side 64, and a suction side 66 as shown in FIG. 5. The pressure and suction sides 64, 66 extend between and interconnect the leading edge 60 and the trailing edge 62. Both the plurality of ceramic bristles 44 and the compressible rope 46 both extend around and engage the leading edge 60, the trailing edge 62, the pressure side 64, and the suction side 66 of the airfoil heat shield 32 in the illustrative embodiment.

In the illustrative embodiments, the ceramic matrix composite materials of the airfoil heat shield 32 comprises reinforcing fibers. The airfoil heat shield 32 has a reduced amount of reinforcing fibers at or near the location where the plurality of bristles 44 of the seal 34 engage the outer surface 32S of the airfoil heat shield 32 compared to the rest of the airfoil heat shield 32. In the illustrative embodiment, the airfoil heat shield 32 has no reinforcing fibers at the location where the plurality of bristles 44 of the seal 34 engages the outer surface 32S of the airfoil heat shield 32.

In the illustrative embodiments, at least a portion of the outer surface 32S of the airfoil heat shield 32 has a different surface finish at a location where the seal 34 engages the outer surface 32S of the airfoil heat shield 32 compared to the rest of the outer surface 32S of the airfoil heat shield 32. The different surface finish on the outer surface 32S is located at the interface where the plurality of ceramic bristles 44 engage the outer surface 32S of the airfoil heat shield 32.

In some embodiments, the different surface finish is a coating 68 as shown in FIG. 3. At least a portion of the outer surface 32S of the airfoil heat shield 32 is defined by the coating 68 as shown in FIG. 5. A portion of the outer surface 32S of the airfoil heat shield 32 that is engaged by the plurality of ceramic bristles 44 of the seal 34 is provided by the coating 68, which is different from any coating applied to other portions of the airfoil heat shield 32. The coating 68 may only be located at the interface where the plurality of ceramic bristles 44 engage the outer surface 32S of the airfoil heat shield 32.

In some embodiments, the coating 68 may be a ceramic coating located only at the interface where the plurality of ceramic bristles 44 engage the outer surface 32S of the airfoil heat shield 32. In some embodiments, the coating 68 may be applied to the entire airfoil heat shield 32 and the coating 68 may be thicker at the location where the seal 34 engages the outer surface 32S of the airfoil heat shield 32 compared to the rest of the outer surface 32S of the airfoil heat shield 32. In some embodiments, the coating 68 may be different at the location where the seal 34 engages the outer surface 32S of the airfoil heat shield 32 compared to the rest of the outer surface 32S of the airfoil heat shield 32.

In some embodiments, the different surface finish is a machined surface. The outer surface 32S of the airfoil heat shield 32 may be machined to provide the different surface finish at the location where the seal 34 engages the outer surface 32S of the airfoil heat shield 32. In some embodiments, the different surface finish may be a chemically etched surface.

In some embodiments, the rest of the outer surface 32S may be machined, while the different surface finish is an unmachined surface. The outer surface 32S of the airfoil heat shield 32 may be unmachined to provide the different surface finish at the location where the seal 34 engages the outer surface 32S of the airfoil heat shield 32.

In the illustrative embodiment, the plurality of ceramic bristles 44 are embedded in the seal plug 42 which is fixed with the flow path ring 30 as shown in FIG. 3A. The orientation of the plurality of ceramic bristles 44 relative to the airfoil heat shield 32 may vary based on a location around the outer surface 32S of the airfoil heat shield 32 in the illustrative embodiment. For example, the bristles 44 may be substantially perpendicular to the outer surface 32S of the airfoil heat shield 32 on the pressure side 64 of the airfoil heat shield 32, while the bristles 44 are at an angle relative to the outer surface 32S of the airfoil heat shield 32 on the suction side 66 of the airfoil heat shield 32 or vice versa. Alternatively or additionally, the orientation of the bristles 44 may vary extending along either one of the pressure and suction sides 64, 66 of the airfoil heat shield 32.

Additionally, a density of the plurality of ceramic bristles 44 of the seal 34 may vary based on a location around the outer surface 32S of the airfoil heat shield 32. For example, the density of the bristles 44 may be greater on the pressure side 64 compared to the suction side 66 of the airfoil heat shield 32 or vice versa. The density of the bristles 44 may vary extending along either one of the pressure and suction sides 64, 66 of the airfoil heat shield 32. Alternatively, the density of the bristles 44 may be greater at the pressure and suction sides 64, 66 of the airfoil heat shield 32 compared to the leading and trailing edges 60, 62.

In the illustrative embodiment, the plurality of bristles 44 are ceramic fibers that are embedded in the monolithic ceramic seal plug 42 as shown in FIG. 3A. In another embodiment, each bristle 44' of the plurality of bristles 44' is a braid or yarn of ceramic material as shown in FIG. 3B. The Turning again to the mounting system 28, the mounting system 28 includes a vane support structure 74 as shown in FIGS. 2-4. The vane support structure 74 is a part of the turbine vane assembly 26.

The vane support structure 74 includes a vane support carrier 76, a pair of vane support hooks 78, and a support spar 80 as shown in FIGS. 2-4. The vane support carrier 76 extends circumferentially at least partway about the central axis 11. The pair of vane support hooks 78 extend radially outward and axially forward from the vane support carrier 76. The pair of vane support hooks 78 engage hangers 72 on the case 22 to couple the vane support structure 74 to the case 22. The support spar 80 extends radially inward from the vane support carrier 76 through the flow path ring 30 and into the airfoil heat shield 32. The support spar 80 is configured to transfer aerodynamic loads from the airfoil heat shield 32 to the vane support carrier 76 and out through the case 22.

In the illustrative embodiment, the airfoil heat shield 32 has an interior cavity 38 as shown in FIGS. 4 and 5. The interior cavity 38 extends radially therethrough and the support spar 80 extends into the interior cavity 38. An interior surface 38S opposite the outer surface 32S defines the interior cavity 38 that is spaced apart from the support spar 80. The outer surface 32S defines the leading and trailing edges 60, 62 and the pressure and suction sides 64, 66 of the airfoil. In the illustrative embodiment, the interior cavity 38 has an airfoil shape.

The vane support carrier 76 includes an outer support wall 82 and a ridge 84 as shown in FIGS. 2 and 3. The outer support wall 82 extends circumferentially at least partway about the central axis 11. The ridge 84 extends radially inward from the outer support wall 82 toward the flow path ring 30. The ridge 84 extends toward the flow path ring 30 to help retain the compressible rope 46 in the groove 56G. The terminal end surface 84S of the ridge 84 faces the compressible rope 46 and may engage the compressible rope 46 to help retain the compressible rope 46 in the groove 56G. In the illustrative embodiment, the ridge 84 is airfoil shaped.

The mounting system 28 further includes a plurality of mounts 70 as shown in FIGS. 2 and 3. The mounts 70 are arranged to extend between the flow path ring 30 and the case 22. In the illustrative embodiment, the mounts 70 are spring mounts and are configured to elastically deform.

In other embodiments, the seal 34 may be used with different gas turbine engine components that comprise ceramic matrix composite. For example, the seal 34 may seal between a first component made of ceramic matrix composite materials and a second component made of ceramic matrix composite materials that extends through an aperture of the first component. The second component may be mounted to allow for movement through the aperture to accommodate thermal growth of components associated with the assembly during use of the assembly in the gas turbine engine 10. The first and second components may be components of an exhaust mixer, a combustor, a rocket swirler, or another assembly in the gas turbine engine 10.

A method of assembling an assembly having a first component 30 and a second component 32 may include several steps. The method may begin with forming the first component 30. If the first component is a flow path ring 30, the method may begin by forming the airfoil aperture 36 and machining the slot 54S in the airfoil aperture 36.

The method may include forming a portion of the seal 34. For example, the seal plug 42 may be formed of a monolithic ceramic with the plurality of bristles 44, 44' embedded in the seal plug 42. Once the seal plug 42 and bristles 44 are formed, the method include inserting the seal plug 42 into the slot 54S so that the bristles 44 are located in the airfoil aperture 36.

The method may further include forming the second component 32. The method may further include applying a coating 68 to form the outer surface 32S of the second component 32. The coating 68 may only be applied at a location where the seal 34 will engage the airfoil heat shield 32. In some embodiments, the coating 68 may be applied to the entire airfoil heat shield 32, while the coating 68 is applied thicker at the location where the seal 34 will engage the airfoil heat shield 32. The method may further include machining the outer surface 32S of the airfoil heat shield 32 at the location where the seal 34 will engage the airfoil heat shield 32.

Next, the method includes assembling the first component 30 with the second component 32. In the illustrative embodiment, the airfoil heat shield 32 may be inserted through the airfoil aperture 36 so that the plurality of ceramic bristles 44 engage the outer surface 32S. Next, the compressible rope 46 may be arranged in the groove 56G formed between the flow path ring 30 and the airfoil heat shield 32.

In the illustrative embodiment, after the compressible rope 46 is located in the groove 56G, the vane support structure 74 may be assembled with the airfoil heat shield 32. After the compressible rope 46 is in the groove 56G, the support spar 80 of the vane support structure 74 may be inserted into the interior cavity 38 of the airfoil heat shield 32. Next, the assembled components are arranged within the case 22. The assembled components are arranged so that the pair of hangers 72 engage the pair of vane support hooks 78 of the vane support structure 74 and the plurality of mounts 70 engage the case 22 and the flow path ring 30.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly adapted for use in a gas turbine engine, the assembly comprising:

a flow path ring made of ceramic matrix composite materials that extends at least part way around a central axis and that is formed to include an airfoil aperture extending radially through the flow path ring, an airfoil heat shield made of ceramic matrix composite materials that extends through the airfoil aperture of the flow path ring, the airfoil heat shield mounted to allow for movement through the airfoil aperture to accommodate thermal growth of components associated with the turbine vane assembly during use of the turbine vane assembly in the gas turbine engine, and a seal configured to resist passage of gases through a gap formed between the flow path ring and the airfoil heat shield along an interface at the airfoil aperture, the seal including a plurality of ceramic bristles that extend from the flow path ring toward the airfoil heat shield to engage an outer surface of the airfoil heat shield thereby establishing a brush seal element, wherein the flow path ring is shaped to include a radially-outwardly facing surface, a radially-inwardly facing surface opposite the radially-outwardly facing surface that defines an outer boundary of a primary gas path, an aperture surface that extends from the radially-inwardly facing surface to define the airfoil aperture, and a chamfer surface that extends between the radially-outwardly facing surface and the aperture surface and cooperates with the outer surface of the airfoil heat shield to define a groove, and wherein the seal further includes a compressible rope located in the groove between the flow path ring and the airfoil heat shield.

2. The turbine vane assembly of claim 1, wherein the aperture surface is formed to include a slot that extends axially into the aperture surface, and wherein the seal further includes a seal plug made of monolithic ceramic material and located in the slot, and wherein the plurality of ceramic bristles are embedded in the seal plug so that the plurality of ceramic bristles extend from the seal plug located in the slot of the flow path ring toward the airfoil heat shield to engage the outer surface of the airfoil heat shield.

3. The turbine vane assembly of claim 1, further comprising a vane support structure configured to support the airfoil heat shield relative to a turbine case included in the gas turbine engine, the vane support structure including an outer support wall coupled to the turbine case that extends circumferentially at least partway about the central axis, a support spar that extends radially inward from the outer support wall through the flow path ring and into the airfoil heat shield, and a ridge that extends radially inward from the outer support wall toward the flow path ring to retain the compressible rope in the groove.

4. The turbine vane assembly of claim 1, wherein a portion of the outer surface of the airfoil heat shield that is engaged by the plurality of ceramic bristles of the seal is provided by a coating different from any coating applied to other portions of the airfoil heat shield.

5. The turbine vane assembly of claim 1, wherein the ceramic matrix composite materials of the airfoil heat shield comprises reinforcing fibers and the airfoil heat shield has a reduced amount of reinforcing fibers at a location where the seal engages the outer surface of the airfoil heat shield compared to the rest of the airfoil heat shield.

6. The turbine vane assembly of claim 5, wherein the airfoil heat shield has no reinforcing fibers at the location where the seal engages the outer surface of the airfoil heat shield.

7. The turbine vane assembly of claim 1, wherein the outer surface of the airfoil heat shield has a different surface finish at a location where the seal engages the outer surface of the airfoil heat shield compared to the rest of the outer surface of the airfoil heat shield.

8. The turbine vane assembly of claim 7, wherein the outer surface of the airfoil heat shield is a machined surface to provide the different surface finish at the location where the seal engages the outer surface of the airfoil heat shield compared to the rest of the outer surface of the airfoil heat shield.

9. The turbine vane assembly of claim 7, wherein the outer surface of the airfoil heat shield is an unmachined surface to provide the different surface finish at the location where the seal engages the outer surface of the airfoil heat shield compared to the rest of the outer surface of the airfoil heat shield.

10. The turbine vane assembly of claim 7, wherein the outer surface of the airfoil heat shield is a coating that is engaged by the plurality of ceramic bristles of the seal, and wherein the coating is thicker at the location where the seal engages the outer surface of the airfoil heat shield compared to the rest of the outer surface of the airfoil heat shield.

11. The turbine vane assembly of claim 7, wherein the outer surface of the airfoil heat shield is a coating that is engaged by the plurality of ceramic bristles of the seal, and wherein the coating is different at the location where the seal engages the outer surface of the airfoil heat shield compared to the rest of the outer surface of the airfoil heat shield.

12. The turbine vane assembly of claim 1, wherein the plurality of ceramic bristles of the seal are substantially perpendicular to the outer surface of the airfoil heat shield.

13. The turbine vane assembly of claim 1, wherein the plurality of ceramic bristles of the seal are at an angle relative to the outer surface of the airfoil heat shield.

14. The turbine vane assembly of claim 1, wherein the airfoil heat shield defines a leading edge, a trailing edge spaced apart axially from the leading edge, a pressure side, and a suction side, the pressure and suction sides extend between and interconnect the leading edge and the trailing edge, and wherein an orientation of the plurality of ceramic bristles of the seal is different based on a location around the leading edge, the trailing edge, the pressure side, and the suction side of the airfoil heat shield.

15. The turbine vane assembly of claim 1, wherein the airfoil heat shield defines a leading edge, a trailing edge spaced apart axially from the leading edge, a pressure side, and a suction side, the pressure and suction sides extend between and interconnect the leading edge and the trailing edge, and wherein a density of the plurality of ceramic bristles of the seal is varied based on a location around the leading edge, the trailing edge, the pressure side, and the suction side of the airfoil heat shield.

16. A turbine vane assembly adapted for use in a gas turbine engine, the assembly comprising:

a flow path ring made of ceramic matrix composite materials that extends at least part way around a central axis and that is formed to include an airfoil aperture extending radially through the flow path ring, an airfoil heat shield made of ceramic matrix composite materials that extends through the airfoil aperture of the flow path ring, the airfoil heat shield mounted to allow for movement through the airfoil aperture to accommodate thermal growth of components associated with the turbine vane assembly during use of the turbine vane assembly in the gas turbine engine, and a seal configured to resist passage of gases through a gap formed between the flow path ring and the airfoil heat shield along an interface at the airfoil aperture, the seal including a plurality of ceramic bristles that extend from the flow path ring toward the airfoil heat shield to engage an outer surface of the airfoil heat shield thereby establishing a brush seal element, wherein the airfoil heat shield defines a leading edge, a trailing edge spaced apart axially from the leading edge, a pressure side, and a suction side, the pressure and suction sides extend between and interconnect the leading edge and the trailing edge, and wherein a density of the plurality of ceramic bristles of the seal is greater at one of the pressure side and the suction side of the airfoil heat shield compared to the leading edge and the trailing edge.

* * * * *